Oct. 24, 1961 M. A. MEYER 3,005,980
PULSED RADAR SYSTEM
Filed Dec. 5, 1958 2 Sheets-Sheet 1

INVENTOR.
MAURICE A. MEYER
BY Fred Jacob
ATTORNEY

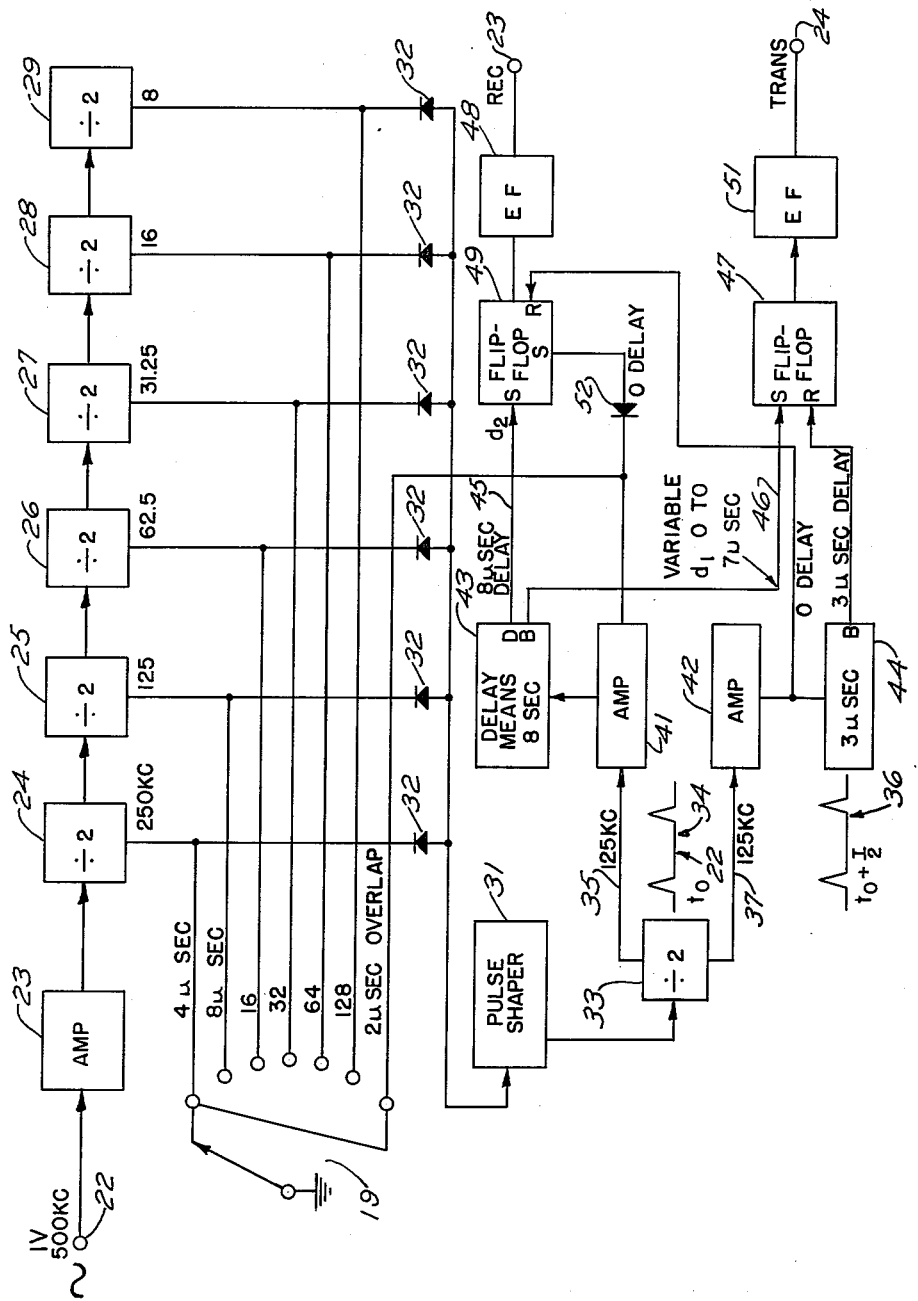

Patented Oct. 24, 1961

3,005,980
PULSED RADAR SYSTEM
Maurice A. Meyer, Natick, Mass., assignor to Laboratory for Electronics, Inc., Boston, Mass., a corporation of Delaware
Filed Dec. 5, 1958, Ser. No. 778,504
11 Claims. (Cl. 343—8)

The present invention relates in general to radar systems and more particularly concerns a novel pulsed Doppler radar system of exceptionally high sensitivity for use in an airborne navigational system. Sensitivity is so high that accurate velocity indications are provided with lightweight, low power equipment even at high altitudes. This application is a continuation-in-part of the co-pending applications of Maurice A. Meyer, entitled Doppler Radar System and Radar System, Serial Nos. 610,444 and 610,443, respectively, filed September 10, 1956, and Signal Selection System, Serial No. 611,811, filed September 20, 1956.

The parent applications disclosed a pulsed Doppler radar system in which transmitter and receiver both had a 50% duty cycle. The present invention represents an improvement thereover. All the advantages of a 50% duty cycle radar system are retained while insuring that the receiver does not respond to the directly radiated pulses. It was discovered that if a full 50% duty cycle was employed for both transmitter and receiver, maximum sensitivity was not realized. This was believed to occur because neither transmitter nor receiver ceased operation immediately upon the cessation of a gating pulse. Thus, for a short time after a switching instant, transmitter and receiver were operative simultaneously and direct signal received from the transmitter by the receiver caused the receiver automatic gain control to reduce receiver sensitivity.

The present invention contemplates and has as a primary object maximizing the sensitivity of a pulsed Doppler radar system having a substantially 50% duty cycle. This is accomplished by enabling the receiver during time intervals between the radiated pulses, such intervals beginning shortly after the end of a radiated pulse and terminating just before the initiation of the next radiated pulse.

In another aspect of the invention, means are provided for rendering the transmitter and receiver simultaneously operative for exceptionally low altitude operation to enhance the accuracy of navigational information when the carrying aircraft is very close to the ground and reliable operation is obtained with low receiver sensitivity.

An other object of the invention is to provide a Doppler radar system which yields accurate velocity information signals, even when relatively close to the ground.

Still another object of the invention is to provide a pulsed radar system in accordance with the preceding object in which a pulse repetition rate may be chosen so that the system sensitivity is maximized.

Still a further object of the invention is to provide a pulsed Doppler radar system in accordance with the preceding objects in which volume, weight and power consumption are minimized without sacrificing accuracy or reliability.

Other features, objects and advantages of the invention will become apparent from the following specification when read in connection with the accompanying drawing in which:

FIG. 3 is a block diagram of a preferred embodiment of a gate generator for providing the receiver and transmitter gating pulses.

Figure 1:
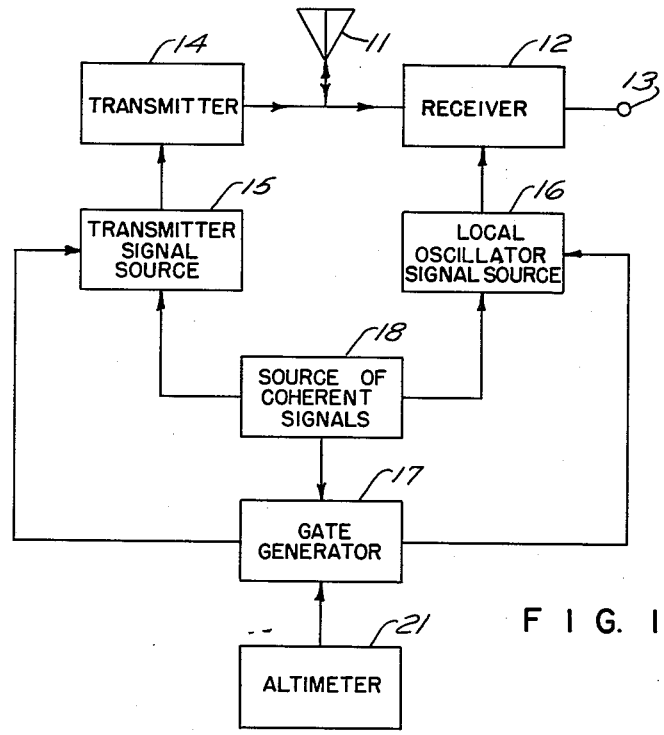
FIG. 1 is a block diagram generally illustrating the logical arrangement of a pulsed Doppler radar system.

With reference now to the drawing and more particularly FIG. 1 thereof, a block diagram is shown to illustrate the logical arrangement of a pulsed Doppler radar system. A portion of the energy radiated by antenna 11 is returned thereto with Doppler frequency shifts. The returned energy is delivered to receiver 12 which provides an output signal on output terminal 13 characteristic of the magnitude of the Doppler frequency shift.

Pulses for radiation are delivered to antenna 11 by transmitter 14 when the latter is energized by transmitted signal source 15. Receiver 12 is disabled except when energized by a signal from local oscillator signal source 16.

A gate generator 17 controls the delivery of transmitted and local oscillator signals so that these signals occur during mutually exclusive time intervals. The gating signal delivered by gate generator 17, the transmitted signal and the local oscillator signal are all derived from a source of coherent signals 18. The indication of an altimeter 21 is utilized to select the frequency of operation of gate generator 17. The frequency is selected preferably so that the duration of each transmitted pulse is substantially equal to the time required for high frequency energy to traverse twice the distance between the system and the surface from which the energy is returned. The advantages of a cohered pulsed Doppler radar system having a substantially 50% duty cycle and a representative embodiment thereof are fully discussed in the aforesaid parent applications.

As indicated above, the transmitter and receiver are on when energized by the transmitted and local oscillator signals, respectively, these signals occurring during mutually exclusive time intervals. The relationship between the operating cycles of the transmitter and receiver will be better understood by referring to FIG. 2 which graphically represents receiver and transmitter on and off times upon a common time scale.

It is convenient to designate an instant of time $t_0$ as a reference time. The transmitter is turned off at a time $d_1$ after $t_0$. The receiver is turned on at a time $d_2$ later than $t_0$, the delay interval $d_2$ being slightly greater than the interval $d_1$. At the highest repetition rate, corresponding to the lowest altitude range, the receiver is turned on at $t_0$, as represented by the dashed curve, thereby causing transmitter and receiver to be operative simultaneously for a short time during each cycle. This mode of operation is especially advantageous when the carrying aircraft is on the ground or at very low altitudes.

The receiver is always turned off $T/2$ after $t_0$, T being the period of a cycle at the selected repetition rate. The transmitter is turned on $d_1+T/2+d_3$ seconds after $t_0$. Both transmitter and receiver are on for slightly less than half a cycle and thus have a duty cycle of just under 50%. As a result, the receiver is turned on after transient due to switching the transmitter off have become negligible and is turned off a sufficient time before the transmitter is again turned on to insure that the receiver is disabled before the transmitter is again activated.

Figure 2:
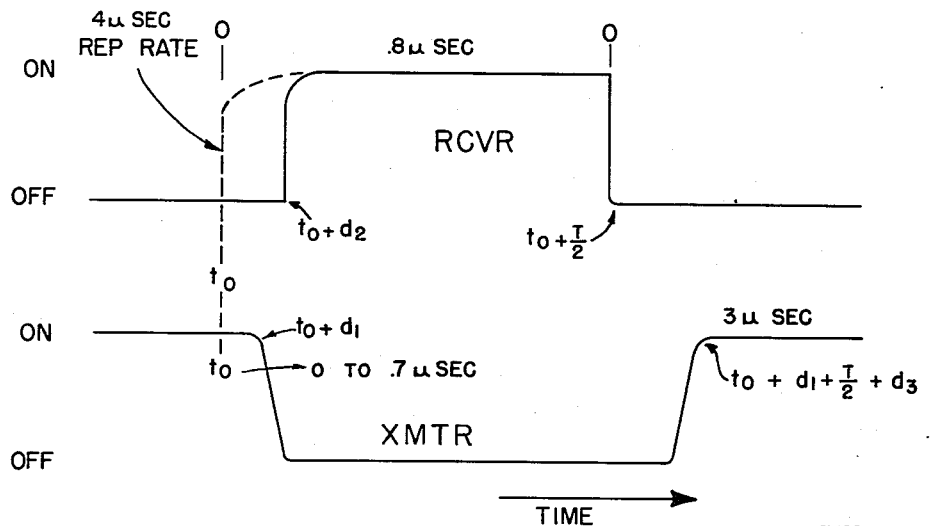
FIG. 2 is a graphical representation as a function of time of transmitter and recievr gating pulses plotted to a common time scale.

Referring to FIG. 3, there is shown a block diagram generally illustrating the logical arrangement of a gate generator for controlling receiver and transmitter operation to produce the duty cycles represented in FIG. 2. A signal from the coherent signal source 18 is applied to input terminal 22 and receiver and transmitter gating signals are provided on terminals 23 and 24, respectively, for delivery to the transmitted signal source 15 and local oscillator signal source 16, respectively.

The input signal applied to terminal 22 is first amplified by amplifier 23 and then applied to the first of six cascaded binary frequency dividers, respectively 24–29. When the frequency of the signal applied to terminal 22 is 500 kilocycles, the output frequencies from the dividers 24–29 are 250, 126, 62.5, 31.25, nearly 16, and nearly 8 kilocycles, respectively, as indicated. The corresponding periods for these frequencies are indicated in microseconds on the line connected from each terminal of switch 19 to a respective divider output line. The output line from each frequency divider is coupled to the input of a pulse shaper 31 by respective buffer diodes 32. The switch 19 grounds one of the output lines of the frequency dividers in accordance with the indication of altimeter 21 to condition the associated buffer diode 32 to pass signals of the desired frequency to pulse shaper 31.

The output of pulse shaper 31 is applied to a frequency divider 33 which provides a first train of pulses 34 on line 35 and a second train of pulses 36 on line 37. The two pulse trains have the same repetition rate but are displaced in time by half the period. Such pulse trains are readily obtained if frequency divider 33 is a flip-flop and the two trains are derived by differentiating the leading edge of each plate waveform. The pulse trains 34 and 36 are amplified by amplifiers 41 and 42, respectively, and applied to delay means 43 and 44, respectively. A delay means 43 provides a signal delayed by the time interval $d_2$, typically 8 microseconds, on line 45 and by the interval $d_1$, which may typically be adjusted within the range 0 to 7 microseconds depending upon the amount of overlap desired, on line 46. Delay means 44 furnishes a delay of $d_3$, typically 3 microseconds.

Flip-flop 49 is normally set by the delayed first train pulses delivered on line 45 and reset by each second train pulse provided by amplifier 42. The output of flip-flop 49 is coupled through emitter follower 48 to the receiver gating signal output terminal 23 to render the receiver on when flip-flop 49 is set.

Flip-flop 47 is reset by each first train pulse delayed by the interval $d_1$ delivered on line 46 and set by each second train pulse delayed by the interval $d_3$ furnished by delay means 44. The output of flip-flop 47 is coupled through emitter follower 51 to the transmitter gating signal output terminal 24 to activate the transmitter when flip-flop 47 is set.

At the highest pulse repetition frequency, corresponding to the lowest altitude, switch 33, in addition to grounding the output of frequency divider 24, connects the negative electrode of a diode 52 to ground, thereby enabling diode 52 to couple undelayed first train pulses to the set input of flip-flop 49 to activate the receiver for a short time interval concurrently with the transmitter.

This type of operation is especially advantageous when the aircraft carrying the pulsed radar system is operating at low altitudes. The path then traversed by returned energy is very short. As a result, energy is returned before the transmitted pulse has ended. By overlapping the operating times of the receiver and transmitter, the receiver may sense the pulse of returned energy for a longer duration with a consequent increase in system insensitivity to noise. The reduction in receiver sensitivity caused by the automatic gain control system responding to the directly radiated signal does not impair system operation because the signal strength of the returned energy is relatively high at low altitudes.

The system described herein maximizes sensitivity while minimizing power consumption, bulk and weight. This occurs because the receiver is allowed to operate at maximum gain during those time intervals in which energy bearing Doppler frequency shift information is being returned and is turned off during intervals in which such information is not present.

The specific frequencies and embodiment described herein are by way of example only. It is apparent that those skilled in the art may make numerous modifications thereof and departures therefrom without departing from the inventive concepts. Consequently, the invention is to be construed as limited only by the spirit and scope of the appended claims.

What is claimed is:

1. A pulsed radar system comprising, a radar transmitter, means for activating said radar transmitter to radiate pulses of high frequency energy during first time intervals, a radar receiver responsive to energy returned from said radiated pulses when activated, and means for activating said radar receiver during second time intervals, each second time interval beginning shortly after the end of the immediately preceding first time interval and ending slightly before the beginning of the immediately following first time interval whereby said receiver is made insensitive to a directly radiated pulse to maximize its sensitivity to said returned energy, the duty cycle of said transmitter and said receiver being each very nearly 50%, the duty cycle of at least one of said receiver and transmitter being slightly less than 50%.

2. Apparatus as in claim 1 wherein the duty cycle of said transmitter and the duty cycle of said receiver are slightly less than 50%.

3. In a pulsed Doppler radar system for providing an output signal characteristic of the relative velocity between said system and a predetermined energy scattering surface, apparatus comprising, a radar transmitter having nearly a 50% duty cycle for radiating pulses toward said scattering surface, a radar receiver responsive to said radiated pulse energy returned from said surface when said receiver is activated, means for controlling the pulse rate of said transmitter in accordance with the distance between said transmitter and said scattering surface, and means for activating said receiver only during time intervals which begin shortly after the termination of each radiated pulse and end just before the next radiated pulse whereby said receiver is activated nearly half the time while being insensitive to the direct radiation of said transmitted pulses.

4. Apparatus as in claim 3, wherein said pulse rate is selected so that the duration of each pulse is approximately equal to the time required for high frequency energy to traverse twice the distance between said system and said scattering surface.

5. Apparatus as in claim 4 wherein said transmitter duty cycle and said receiver duty cycle are slightly less than 50%.

6. Apparatus for providing first gating pulses having nearly a 50% duty cycle and second gating pulses which occur in the time intervals between said first gating pulses comprising, a source of periodic timing pulses having a predetermined period, means responsive to said timing pulses for providing first and second trains of trigger pulses having said predetermined period, said pulse trains being spaced in time by substantially half said predetermined period, means for delaying each first train pulse and each second train pulse by first and second time intervals respectively, each of said time intervals being much less than said predetermined period, means responsive to each first train pulse delayed by said first time interval for initiating a first gating pulse, means responsive to each second train pulse for terminating a first gating pulse, means for delaying each first train pulse by a third time interval less than said first time interval, means responsive to each first train pulse delayed by said third time interval for initiating a second gating pulse, and means responsive to each second train delayed pulse for terminating said second gating pulse.

7. Apparatus in accordance with claim 6 and further comprising, selective means for initiating said first gating pulse in response to each first train gating pulse instead of said first train gating pulses delayed by said first time interval whereby portions of said first and second gating pulses overlap in time.

8. A pulsed Doppler radar system comprising, a transmitter for radiating high frequency energy only when activated in response to a first gating pulse, a receiver responsive to said high frequency energy only when activated in response to a second gating pulse, a source of periodic timing pulses having one of a plurality of selectable integrally related periods, means responsive to said timing pulses for providing first and second trains of trigger pulses having said one period, said pulse trains being spaced in time by substantially half said one period, means for delaying each first train pulse and each second train pulse by first and second time intervals respectively, each one of said time intervals being much less than said one period, means for delaying each first train pulse by a third time interval less than said first time interval, means responsive to each first train pulse delayed by said third time interval for initiating a said first gating pulse, means responsive to each second train delayed pulse for terminating said first gating pulse, means responsive to each first train pulse delayed by said first time interval for initiating a said second gating pulse, means responsive to each second train pulse for terminating said second gating pulse, and means for coupling said first and second gating pulses to said transmitter and receiver respectively.

9. A pulsed Doppler radar system comprising, a radar transmitter, means for activating said radar transmitter to radiate pulses of high frequency energy during first time intervals, a radar receiver responsive to energy returned from said radiated pulses when activated, and means for activating said radar receiver during second time intervals, a small portion of said first and second time intervals overlapping whereby said radar transmitter and receiver are simultaneously operative for only a short time interval.

10. A pulsed Doppler radar system comprising, a radar transmitter, means for activating said radar transmitter to radiate pulses of high frequency energy toward a scattering surface during first time intervals, a radar receiver responsive to energy carried by said radiated pulses returned from said scattering surface when activated, means for activating said radar receiver during second time intervals normally exclusive of said first time intervals, distance sensing means for indicating the distance between said radar system and said scattering surface, and means responsive to said distance sensing means indicating said distance is less than a predetermined value for causing said first and second time intervals to overlap slightly.

11. A pulsed Doppler radar system carried aboard an aircraft comprising, a radar transmitter, means for activating said radar transmitter to radiate pulses of high frequency energy toward the earth during first time intervals, a radar receiver responsive to energy carried by said radiated pulses returned from the earth when activated, means for activating said radar receiver during second time intervals normally exclusive of said first time intervals, altitude sensing means for indicating the altitude of said aircraft, and means responsive to said altitude sensing means indicating said altitude is less than a predetermined value for causing said first and second time intervals to overlap slightly.

References Cited in the file of this patent

UNITED STATES PATENTS 2,494,990    De Lano  _____ Jan. 17, 1950